(12) United States Patent
Hanashima

(10) Patent No.: US 12,384,310 B2
(45) Date of Patent: Aug. 12, 2025

(54) INSTRUMENT PANEL STRUCTURE

(71) Applicant: Yazaki Corporation, Tokyo (JP)

(72) Inventor: Manabu Hanashima, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 410 days.

(21) Appl. No.: 18/192,974

(22) Filed: Mar. 30, 2023

(65) Prior Publication Data

US 2023/0312010 A1    Oct. 5, 2023

(30) Foreign Application Priority Data

Apr. 4, 2022    (JP) .................. 2022-062335

(51) Int. Cl.
*B60R 16/02* (2006.01)
*B62D 25/14* (2006.01)

(52) U.S. Cl.
CPC ...... *B60R 16/0215* (2013.01); *B60R 16/0207* (2013.01); *B62D 25/145* (2013.01)

(58) Field of Classification Search
CPC ............... B62D 25/145; B62D 25/147; B60R 16/0215; B60R 16/0207
USPC .................................................. 296/193.02
See application file for complete search history.

(56) References Cited

U.S. PATENT DOCUMENTS

| | | | | |
|---|---|---|---|---|
| 5,706,170 A * | 1/1998 | Glovatsky | .......... | H05K 7/20863 361/627 |
| 5,844,169 A * | 12/1998 | Uemura | .............. | B60R 16/0215 138/119 |
| 8,668,253 B2 * | 3/2014 | Bauer | ................. | B60R 16/0215 296/199 |
| 9,270,101 B2 * | 2/2016 | Iio | ........................ | H02G 3/0487 |
| 9,381,883 B2 * | 7/2016 | Morita | ................. | B60R 21/203 |
| 10,407,109 B2 * | 9/2019 | Kaneko | ................. | B62D 25/145 |
| 10,464,614 B2 * | 11/2019 | Kajikawa | ............... | B62D 25/20 |

(Continued)

FOREIGN PATENT DOCUMENTS

| | | | | |
|---|---|---|---|---|
| DE | 102022207020 A1 * | 1/2024 | ............... | B62D 1/18 |
| JP | H0752683 A * | 2/1995 | ........... | B62D 25/142 |

(Continued)

OTHER PUBLICATIONS

Translation of DE102022207020A1 (Year: 2025).*

(Continued)

*Primary Examiner* — Jason S Morrow
(74) *Attorney, Agent, or Firm* — Sughrue Mion, PLLC

(57) ABSTRACT

A reinforcement is bridged between left and right front pillars of a vehicle, and includes: a first pipe arranged at a driver-seat side; and a second pipe having a diameter smaller than a diameter of the first pipe and arranged at a passenger-seat side. A protector is attached to the reinforcement and accommodates a wire harness routed along the reinforcement. An instrument panel is held by the reinforcement and arranged between the left and right front pillars. In a case where a driver seat is positioned on a right side of the vehicle, a locking portion on a right side of the protector is locked in a mounting portion of the first pipe. In a case where a driver seat is positioned on a left side of the vehicle, a locking portion on a left side of the protector is locked in the mounting portion of the first pipe.

3 Claims, 6 Drawing Sheets

(56) References Cited

U.S. PATENT DOCUMENTS

2005/0280288 A1* 12/2005 Suzuki .............. B60R 16/0215
    296/208
2019/0300040 A1* 10/2019 Abe .................... B62D 25/145
2023/0312010 A1* 10/2023 Hanashima ......... B60R 16/0207
    296/193.02
2025/0018884 A1* 1/2025 Suganuma .......... B60R 16/0215

FOREIGN PATENT DOCUMENTS

| | | | |
|---|---|---|---|
| JP | H07298447 A | * | 11/1995 |
| JP | 2008278605 A | * | 11/2008 |
| JP | 2016-120803 A | | 7/2016 |
| WO | WO-2016076095 A1 | * | 5/2016 ......... B60R 16/0215 |

OTHER PUBLICATIONS

Translation of JP2002278605A (Year: 2025).*
Translation of JPH07298447A (Year: 2025).*
Translation of JPH0752683A (Year: 2025).*
Translation of WO2016076095 (Year: 2025).*

* cited by examiner

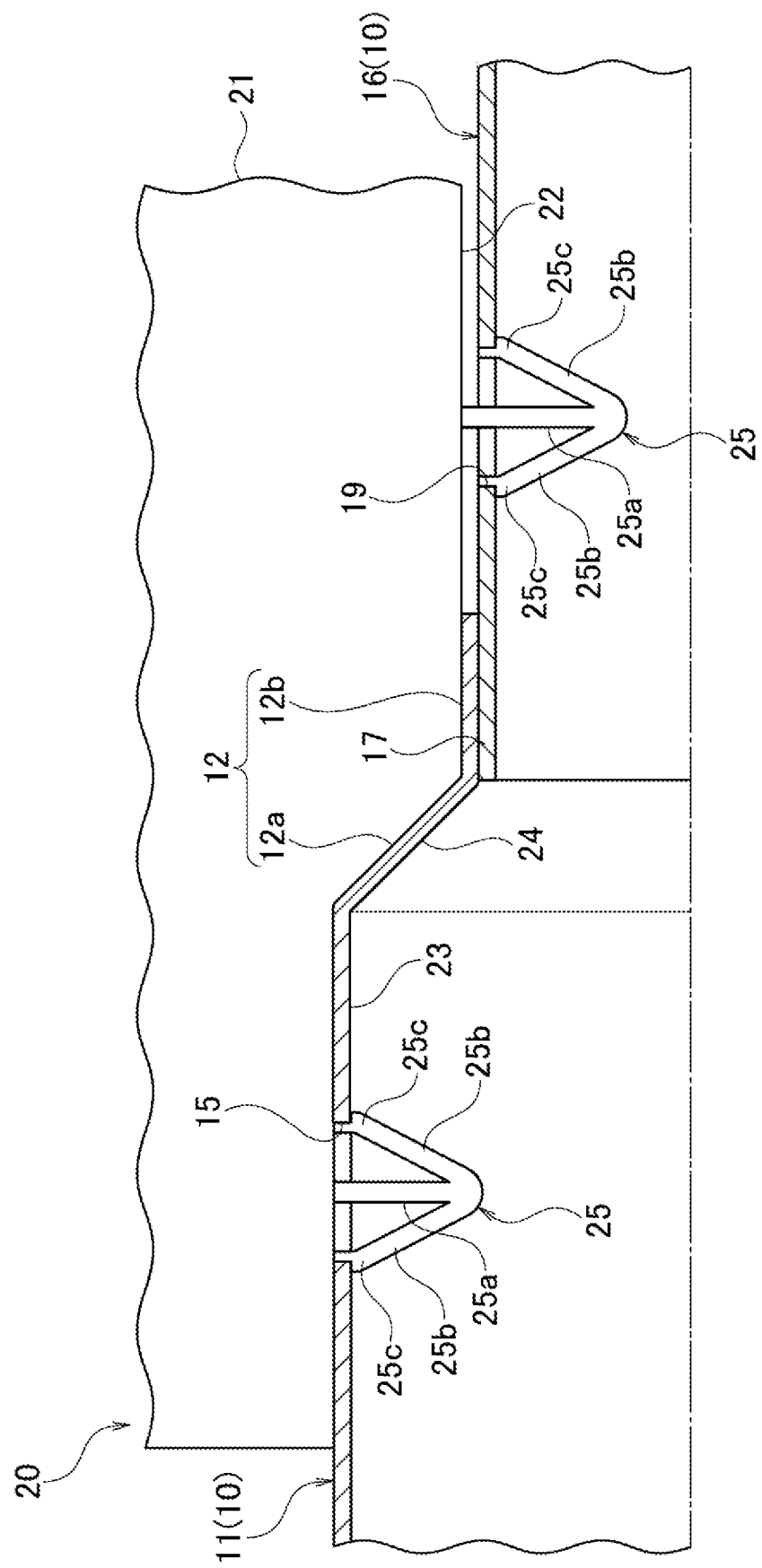

INSTRUMENT PANEL STRUCTURE

CROSS-REFERENCE TO RELATED APPLICATIONS

The present application is based on, and claims priority from the prior Japanese Patent Applications No. 2022-062335, filed on Apr. 4, 2022, the entire contents of which are incorporated herein by reference.

TECHNICAL FIELD

The disclosure relates to an instrument panel structure.

BACKGROUND

An instrument panel installed in the interior of an automobile is generally provided with a reinforcement (R/F) as a reinforcing member for the instrument panel. JP 2016-120803 A discloses an instrument panel structure held by a reinforcement. The instrument panel structure is assembled in the reinforcement of a vehicle in which a wire harness is routed, to form the instrument panel portion of the vehicle.

SUMMARY

In the above instrument panel structure, the wire harness is routed along the reinforcement, and thus a protector needs to be provided to protect the wire harness. However, there are two specifications for vehicles: a right-hand-drive type (a type in which the driver seat is arranged on the right side of the vehicle) and a left-hand-drive type (a type in which the driver seat is arranged on the left side of the vehicle). Accordingly, in the course of controlling the wiring route of the wire harness, the development of a protector that can be commonly used for vehicles of two specifications has been desired in view of man-hours and costs.

The disclosure is directed to an instrument panel structure that can be commonly used for both a right-hand-drive type and a left-hand-drive type of vehicles using a protector that is a single component configured to accommodate and protect a wire harness. The instrument panel structure using such a protector makes it possible to achieve low costs by reducing man-hours.

An instrument panel structure in accordance with some embodiments includes: a reinforcement bridged between left and right front pillars of a vehicle, and including a first pipe arranged at a driver-seat side and a second pipe having a diameter smaller than a diameter of the first pipe and arranged at a passenger-seat side; a wire harness routed along the reinforcement; a protector attached to the reinforcement, and accommodating and protecting the wire harness; and an instrument panel held by the reinforcement and arranged between the left and right front pillars. The first pipe includes at least one mounting portion and the second pipe includes at least one mounting portion. The protector includes locking portions at a center and both sides thereof, the locking portions being locked in the mounting portion of the first pipe and in the mounting portion of the second pipe. In a case where a driver seat is positioned on a right side of the vehicle, the locking portion on a right side of the protector is locked in the mounting portion of the first pipe. In a case where a driver seat is positioned on a left side of the vehicle, the locking portion on a left side of the protector is locked in the mounting portion of the first pipe.

According to the above configuration, it is possible to provide an instrument panel structure that can be commonly used for both a right-hand-drive type and a left-hand-drive type of vehicle using a protector that is a single component configured to accommodate and protect a wire harness. The instrument panel structure using such a protector makes it possible to achieve low costs by reducing man-hours.

BRIEF DESCRIPTION OF THE DRAWINGS

FIG. 2C is a cross-sectional view of the main part of the instrument panel structure in a state in which the protector is attached to the reinforcement of FIG. 2B.

DETAILED DESCRIPTION

An instrument panel structure according to an embodiment of the present invention will be described in detail hereinafter with reference to the accompanying drawings.

Figure 1A:
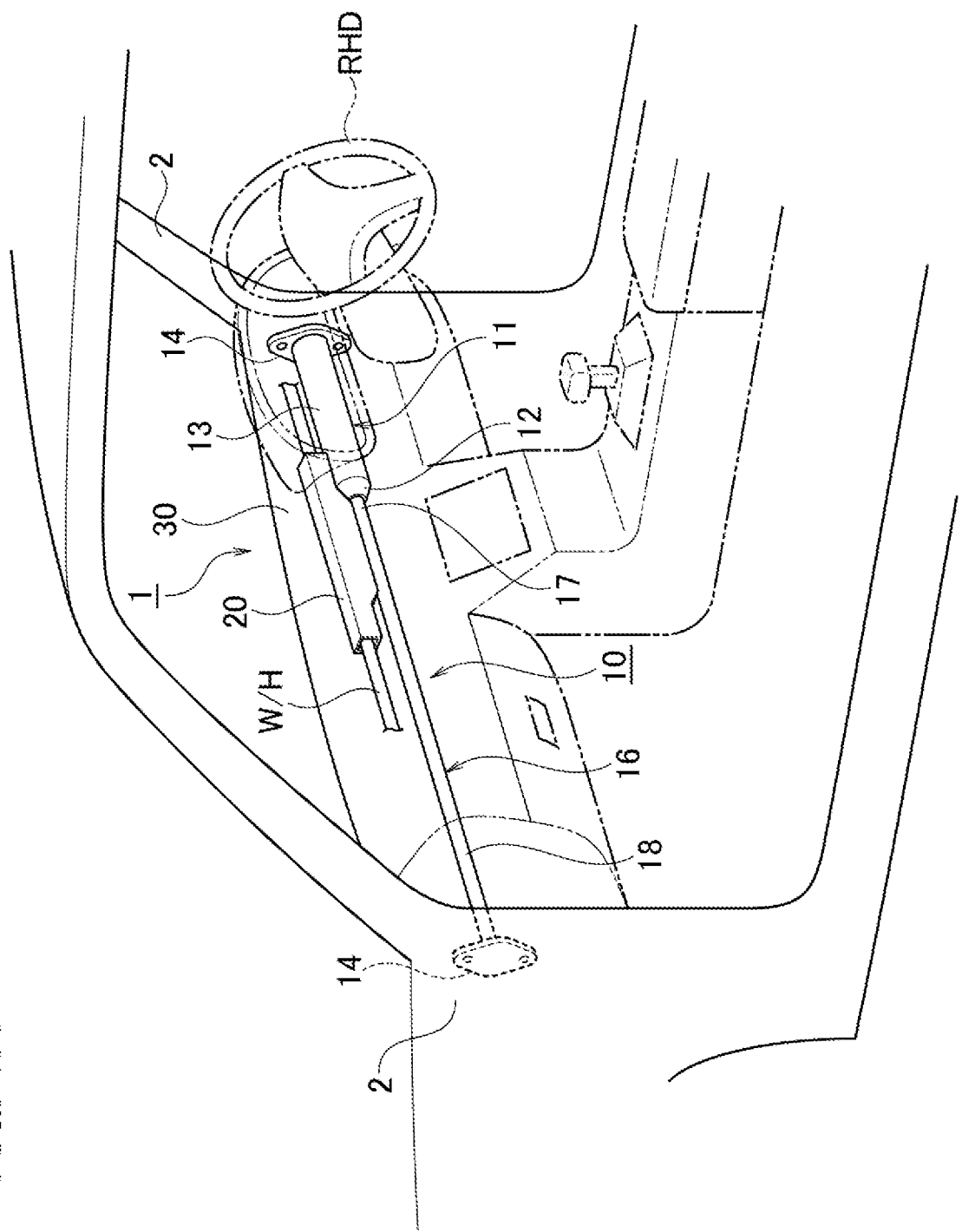
FIG. 1A is a perspective view illustrating an example of a driver seat of a right-hand-drive vehicle provided with an instrument panel structure for right-hand drive according to an embodiment of the present invention.
Figure 1B:
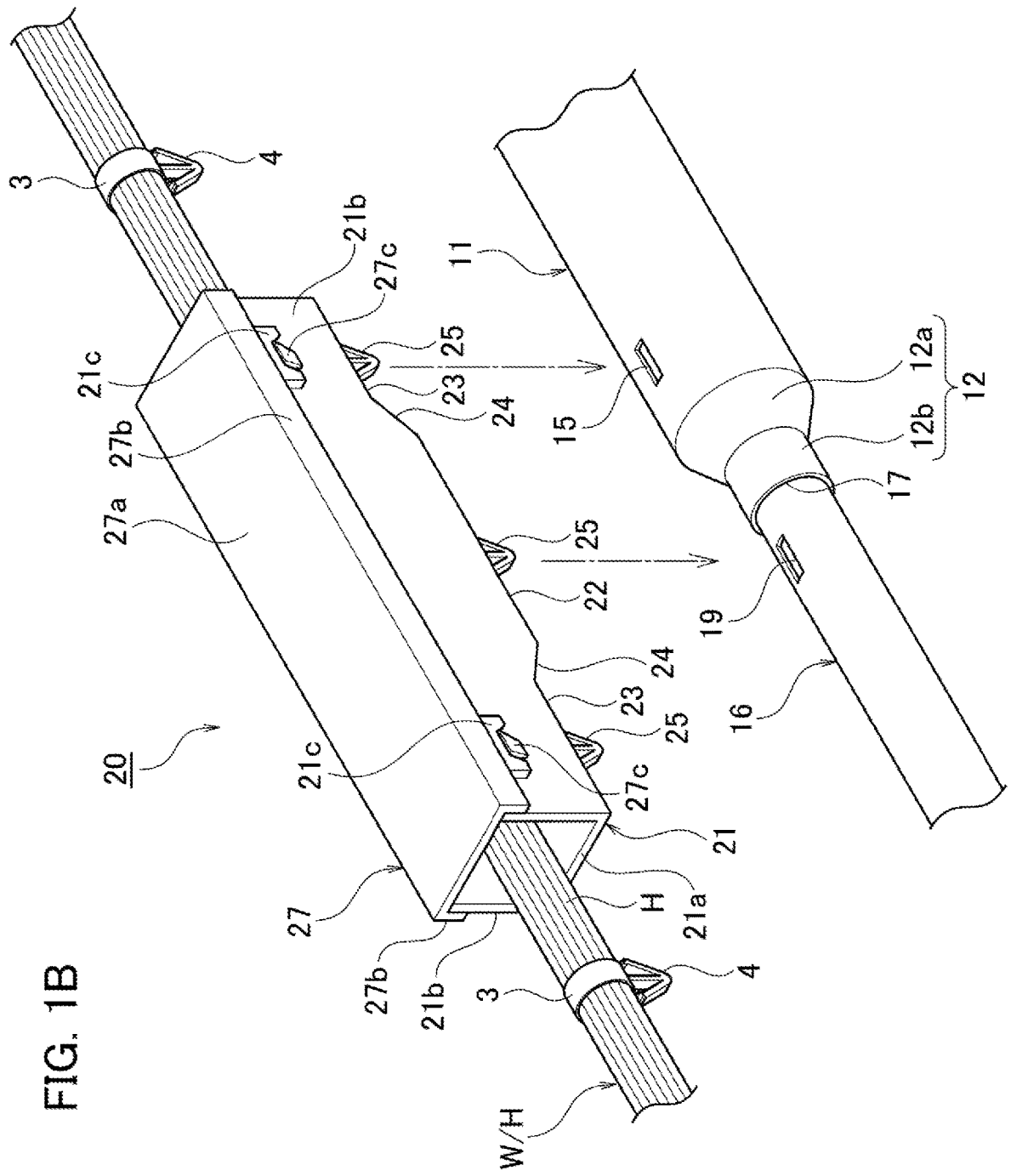
FIG. 1B is a perspective view of the instrument panel structure of FIG. 1A before a protector is attached to a reinforcement.
Figure 1C:
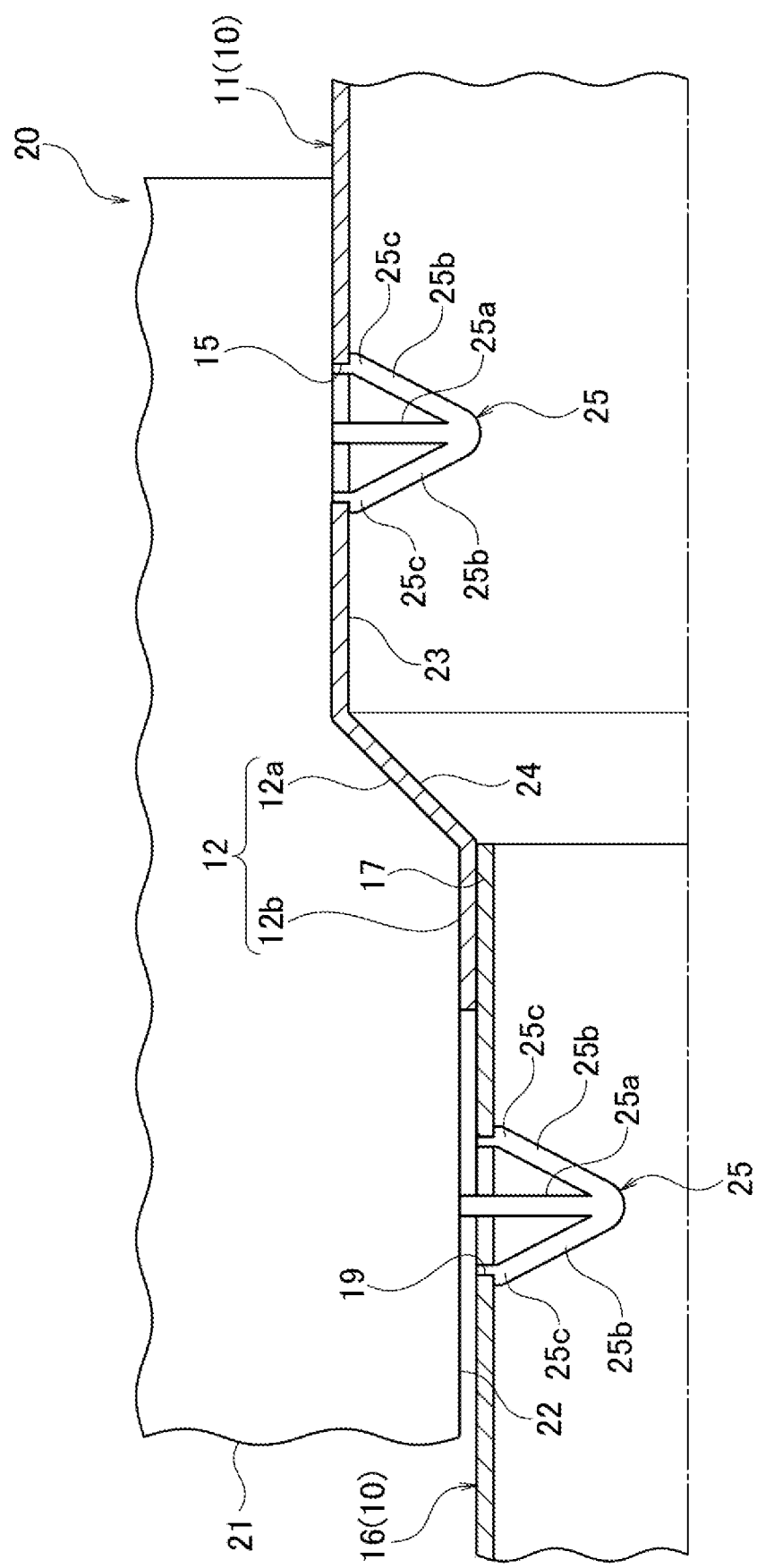
FIG. 1C is a cross-sectional view of the main part of the instrument panel structure in a state in which the protector is attached to the reinforcement of FIG. 1B.
Figure 2A:
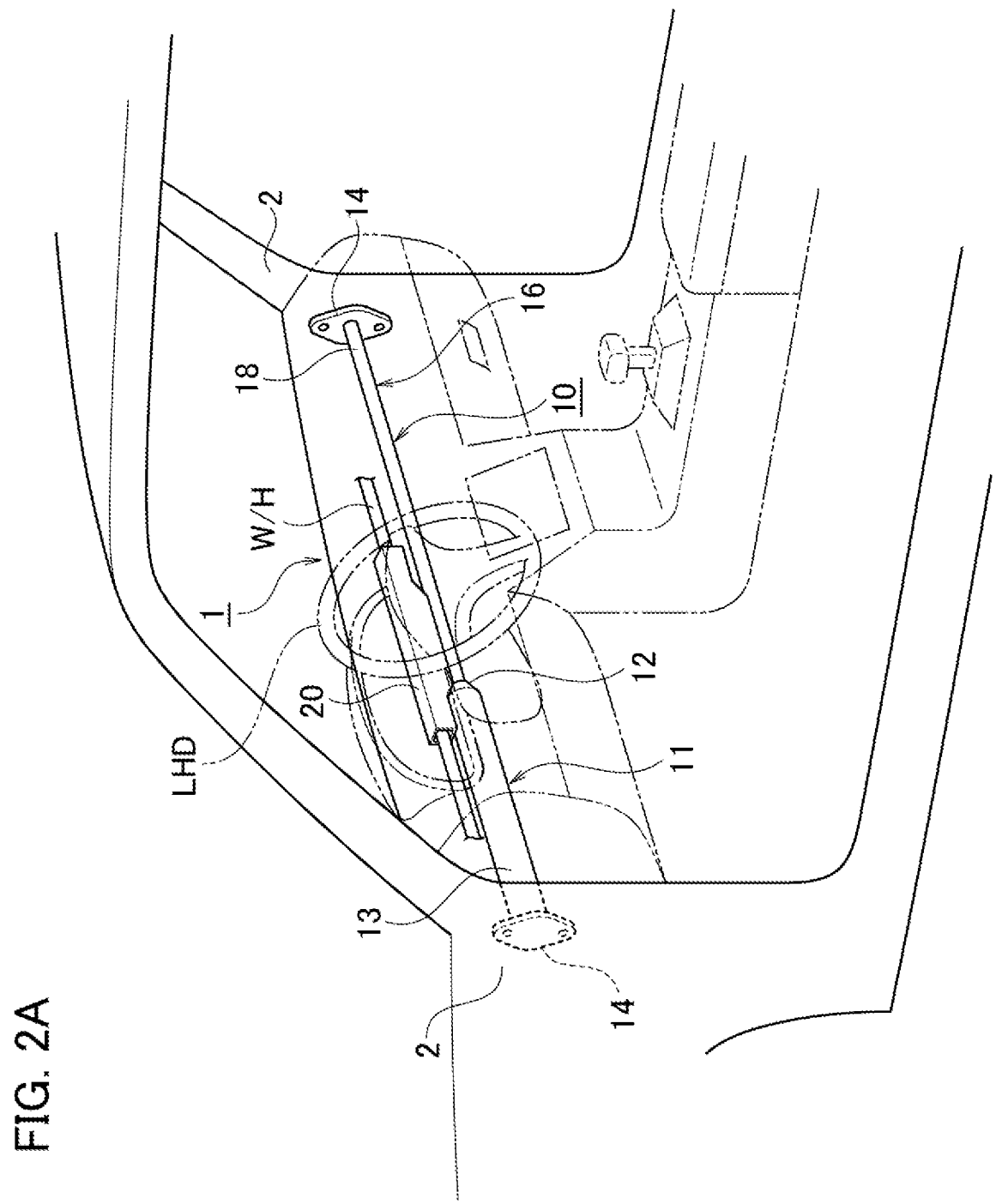
FIG. 2A is a perspective view illustrating an example of a driver seat of a left-hand-drive vehicle provided with an instrument panel structure for left-hand drive according to an embodiment of the present invention.
Figure 2B:
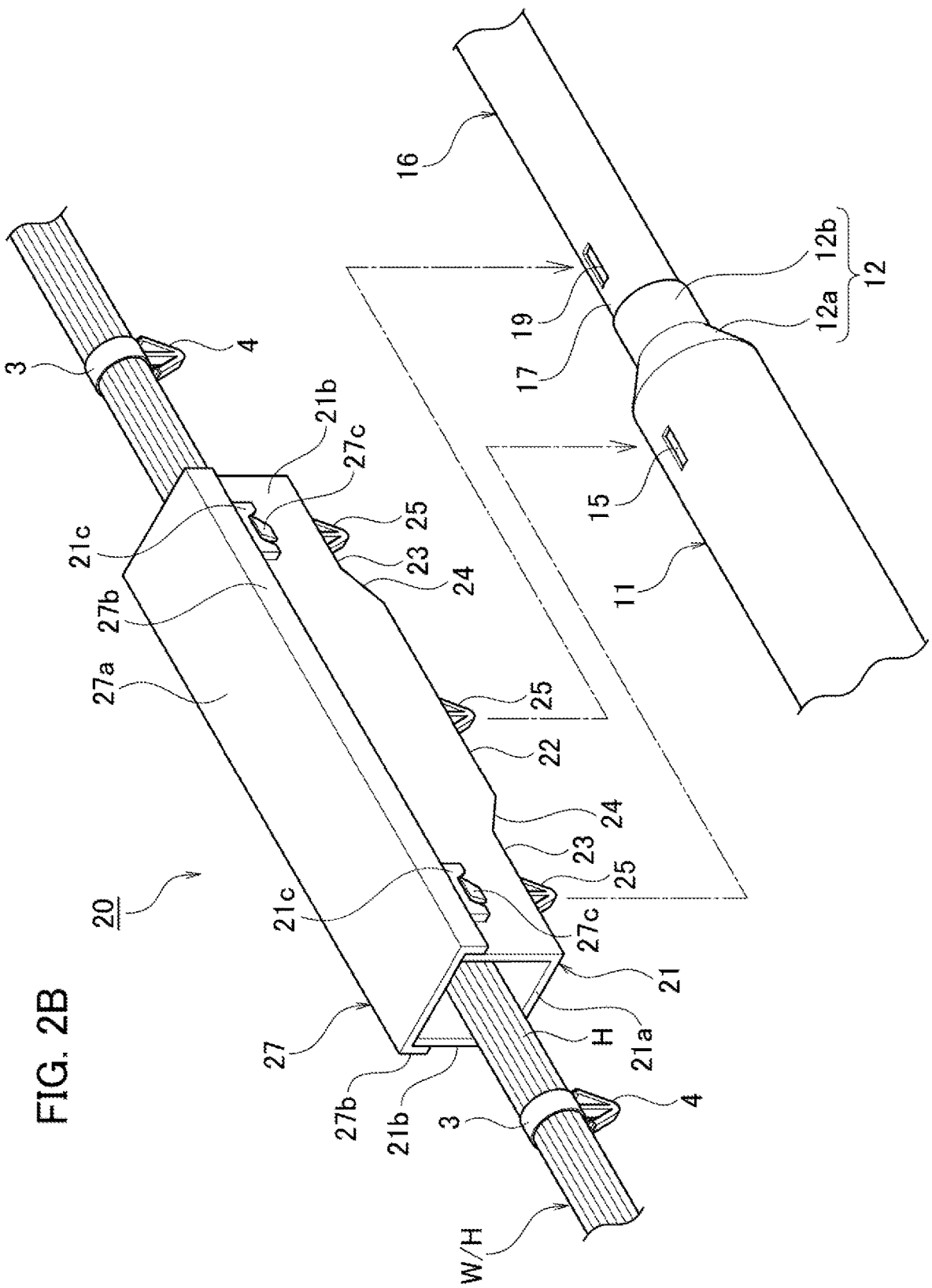
FIG. 2B is a perspective view of the instrument panel structure of FIG. 2A before a protector is attached to a reinforcement.

FIG. 1A is a perspective view illustrating an example of a driver seat of a right-hand-drive vehicle provided with an instrument panel structure 1 for right-hand drive according to an embodiment of the present invention. FIG. 1B is a perspective view of the instrument panel structure 1 of FIG. 1A before a protector 20 is attached to a reinforcement 10. FIG. 1C is a cross-sectional view of the main part of the instrument panel structure in a state in which the protector 20 is attached to the reinforcement 10 of FIG. 1B. FIG. 2A is a perspective view illustrating an example of a driver seat of a left-hand-drive vehicle provided with an instrument panel structure 1 for left-hand drive according to an embodiment of the present invention. FIG. 2B is a perspective view of the instrument panel structure 1 of FIG. 2A before a protector 20 is attached to a reinforcement 10. FIG. 2C is a cross-sectional view of the main part of the instrument panel structure in a state in which the protector 20 is attached to the reinforcement 10 of FIG. 2B.

As illustrated in FIG. 1A and FIG. 2A, an instrument panel structure 1 includes: a metal cylindrical reinforcement 10; a wire harness W/H formed by bundling a plurality of electric wires H; a synthetic resin protector 20; and a synthetic resin instrument panel 30.

The reinforcement 10 is formed of a metal cylindrical pipe and is a reinforcing member that increases the rigidity of a vehicle body against external impact. The reinforcement 10 is bridged between left and right front pillars 2 of a vehicle so as to fix a steering wheel and various devices such as an ECU. The reinforcement 10 includes: a cylindrical large-diameter pipe (first pipe) 11 arranged at the driver-seat side; and a cylindrical small-diameter pipe (second pipe) 16 having a diameter smaller than a diameter of the large-diameter pipe 11 and arranged at the passenger-seat side.

The large-diameter pipe 11 and the small-diameter pipe 16 are joined together by means of welding or the like to form the cylindrical reinforcement 10, which results in a weight reduction and high rigidity of the vehicle. In order to increase the rigidity of the reinforcement 10 at the driver-seat side, the large-diameter pipe 11 is arranged at the driver-seat side. That is, when the rigidity of the driver-seat side is low, the reinforcement 10 deforms and a steering displacement occurs in the event of a vehicle collision; however, the high rigidity of the large-diameter pipe 11 prevents the driver from being in danger in the event of such a vehicle collision.

As illustrated in FIGS. 1B and 1C and FIGS. 2B and 2C, an inner end 12, which is one end of the cylindrical large-diameter pipe 11, is reduced in diameter toward the cylindrical small-diameter pipe 16. That is, the inner end 12 is configured of: a taper portion 12a having an inner diameter that is reduced in diameter in a taper shape to such an extent that the inner diameter is approximately equal to the outer diameter of an inner end 17 which is one end of the small-diameter pipe 16; and a connecting portion 12b which is formed continuously from the taper portion 12a and serves as a parallel pipe within a range of a certain length. As illustrated in FIGS. 1A and 2A, an outer end 13, which is the other end of the large-diameter pipe 11, is provided with a bracket 14 that is bolted to the front pillar 2. A mounting elongate hole 15 as a mounting portion is provided at a position closer to the inner end 12 between both ends of the large-diameter pipe 11 (between the inner end 12 and the outer end 13).

As illustrated in FIG. 1C and FIG. 2C, the inner end 17, which is one end of the cylindrical small-diameter pipe 16, is inserted and welded in an overlapping state in which the inner end 17 comes in contact with the inner circumferential surface of the inner end 12 of the cylindrical large-diameter pipe 11 serving as a parallel pipe. As illustrated in FIG. 1A and FIG. 2A, an outer end 18, which is the other end of the small-diameter pipe 16, is provided with a bracket 14 that is bolted to the front pillar 2. A mounting elongate hole 19 as a mounting portion is provided at a position closer to the inner end 17 between both ends of the small-diameter pipe 16 (between the inner end 17 and the outer end 18).

As illustrated in FIG. 1B and FIG. 2B, the wire harness W/H is configured of a bundle of electric wires in which a plurality of electric wires H are bundled together by bands 3 having clamps 4. The wire harness W/H is inserted into a box-shaped protector 20 extending in the longitudinal direction and routed along the cylindrical reinforcement 10.

The protector 20 includes a long box-shaped protector body 21 with the upper side and the left and right sides open, and a long box-shaped lid body 27 with the lower side and the left and right sides open. In the protector 20, the protector body 21 is attached to the reinforcement 10, and the wire harness W/H is accommodated and protected in the protector 20.

As illustrated in FIG. 1B and FIG. 2B, the protector body 21 of the protector 20 includes a bottom wall 21a, and both side walls 21b that stand vertically from both sides of the bottom wall 21a. A convex portion 22 is provided at the lower surface side at the center of the protector body 21 (that is, at the center of the bottom wall 21a). Recesses 23 are provided at the lower surface side on the left and right sides of the protector body 21, respectively (that is, on the left and right sides of the bottom wall 21a). Inclined surfaces 24 that come into contact with the taper portion 12a of the large-diameter pipe 11 are provided between the lower surface at the center of the convex portion 22 and the lower surface of each recess 23 on the left and right sides, respectively. Clips 25 as locking portions are provided in a protruding manner in the convex portion 22 at the center and in each recess 23 on the left and right sides, and the clips 25 are locked in the elongate hole 15 of the large-diameter pipe 11 and in the elongate hole 19 of the small-diameter pipe 16.

As illustrated in FIG. 1B and FIG. 2B, a lid body 27 of the protector 20 includes a ceiling wall 27a, and both side walls 27b that hang from both sides of the ceiling wall 27a. The opening of the protector body 21 at the upper surface side is covered with the lid body 27, and in a state in which locking protrusions 27c of the side walls 27b of the lid body 27 are locked in lock recesses 21c of the side wall 21b of the protector body 21, the wire harness W/H is accommodated and protected therein.

As illustrated in FIG. 1C and FIG. 2C, the clips 25 that protrude from the lower surface of the convex portion 22 at the center of the protector body 21 and the lower surfaces of the recesses 23 on the left and right sides of the protector body 21 include a support portion 25a, and a pair of elastic pieces 25b that are formed in an inverted V-shape from the tip of the support portion 25a. In a case where the protector body 21 is attached to the reinforcement 10, when the pair of inverted V-shaped elastic pieces 25b of the clip 25 are respectively inserted into the mounting elongate hole 15 of the large-diameter pipe 11 and the mounting elongate hole 19 of the small-diameter pipe 16, the pair of elastic pieces 25b elastically deform toward the support portion 25a side. Thereafter, when each of L-shaped locking protrusions 25c provided at the tip of the pair of elastic pieces 25b is locked to the short edges of the mounting elongate holes 15 and 19, this locking state is maintained by the elastic biasing force of the pair of elastic pieces 25b, and the clips 25 do not come out of the mounting elongate holes 15 and 19.

As illustrated in FIG. 1B, in the case of right-hand drive RHD (in the case where the driver seat is positioned on the right side of a vehicle), the clip 25 that is provided in a protruding manner in the right-side recess 23 of the protector 20 is locked in the mounting elongate hole 15 of the large-diameter pipe 11 arranged at the driver-seat side of the reinforcement 10. As illustrated in FIG. 2B, in the case of left-hand drive LHD (in the case where the driver seat is positioned on the left side of a vehicle), the clip 25 that is provided in a protruding manner in the left-side recess 23 of the protector 20 is locked in the mounting elongate hole 15 of the large-diameter pipe 11 arranged at the driver-seat side of the reinforcement 10.

The instrument panel 30 is made of synthetic resin. The instrument panel 30 is held by the reinforcement 10 and arranged between the left and right front pillars 2 in such a way as to cover the protector 20 and the wire harness W/H.

As described above, according to the instrument panel structure 1 of the present embodiment, as illustrated in FIG. 1B, in the case of right-hand drive RHD, the clip 25 that is provided in a protruding manner in the right-side recess 23 of the protector 20 is locked in the mounting elongate hole 15 of the large-diameter pipe 11 arranged at the driver-seat side of the reinforcement 10. Further, the clip 25 that is provided in a protruding manner on the convex portion 22 at the center of the protector 20 is locked in the mounting elongate hole 19 of the small-diameter pipe 16 arranged at the passenger-seat side of the reinforcement 10. Since these clips 25 are locked in this way, the protector 20 accommodating the wire harness W/H is attached onto the reinforcement 10. At this time, as illustrated in FIG. 1C, the inclined surface 24 between the convex portion 22 and the right-side recess 23 of the protector 20 is in contact with the tapered portion 12a of the large-diameter pipe 11 of the reinforcement 10 without a gap, and the bottom surface of the convex portion 22 of the protector 20 is in contact with the connecting portion 12b of the large-diameter pipe 11 without a gap. These contacts make it possible to hold the wire harness W/H at both ends of the protector 20. Although only the two clips 25 out of the three clips 25 of the protector 20 are fixed to the reinforcement 10, the bundle of thick electric wires of the wire harness W/H passing through the protector 20 ensures the rigidity of the protector 20, thereby preventing interference with peripheral components.

As illustrated in FIG. 2B, in the case of left-hand drive LHD, the clip 25 that that is provided in a protruding manner in the left-side recess 23 of the protector 20 is locked in the mounting elongate hole 15 of the large-diameter pipe 11 arranged at the driver-seat side of the reinforcement 10. Further, the clip 25 that is provided in a protruding manner on the convex portion 22 at the center of the protector 20 is locked in the mounting elongate hole 19 of the small-diameter pipe 16 arranged at the passenger-seat side of the reinforcement 10. Since these clips 25 are locked in this way, the protector 20 accommodating the wire harness W/H is attached onto the reinforcement 10. At this time, as illustrated in FIG. 2C, the inclined surface 24 between the convex portion 22 and the left-side recess 23 of the protector 20 is in contact with the tapered portion 12a of the large-diameter pipe 11 of the reinforcement 10 without a gap, and the bottom surface of the convex portion 22 of the protector 20 is in contact with the connecting portion 12b of the large-diameter pipe 11 without a gap. These contacts make it possible to hold the wire harness W/H at both ends of the protector 20. Although only the two clips 25 out of the three clip 25 of the protector 20 are fixed to the reinforcement 10, the bundle of thick electric wires of the wire harness W/H passing through the protector 20 ensures the rigidity of the protector 20, thereby preventing interference with peripheral components.

As described above, the present disclosure makes it possible for a protector 20 that is a single component configured to accommodate and protect a wire harness to be commonly used for both a right-hand-drive RHD type and a left-hand-drive LHD type of vehicles. Therefore, it is possible to achieve low costs by reducing man-hours because of such a protector.

In the above embodiment, the large-diameter pipe 11 and the small-diameter pipe 16 are joined together to form the cylindrical reinforcement 10; however, the present embodiment is not limited to this configuration. For example, it may be possible to form the cylindrical reinforcement 10 by integrally molding a flat plate having a wide section that is a large-diameter section and a narrow section that is a small-diameter section by means of bending processing or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An instrument panel structure comprising:
   a reinforcement bridged between left and right front pillars of a vehicle, and including a first pipe arranged at a driver-seat side and a second pipe having a diameter smaller than a diameter of the first pipe and arranged at a passenger-seat side;
   a wire harness routed along the reinforcement;
   a protector attached to the reinforcement, and accommodating and protecting the wire harness; and
   an instrument panel held by the reinforcement and arranged between the left and right front pillars, wherein
   the first pipe includes at least one mounting portion and the second pipe includes at least one mounting portion,
   the protector includes locking portions at a center and both sides thereof, the locking portions being locked in the mounting portion of the first pipe and in the mounting portion of the second pipe,
   in a case where a driver seat is positioned on a right side of the vehicle, the locking portion on a right side of the protector is locked in the mounting portion of the first pipe, and
   in a case where a driver seat is positioned on a left side of the vehicle, the locking portion on a left side of the protector is locked in the mounting portion of the first pipe.

2. The instrument panel structure according to claim 1, wherein
   the first pipe includes a mounting elongate hole as the mounting portion and the second pipe includes a mounting elongate hole as the mounting portion,
   the protector includes a convex portion positioned at a lower surface side at the center of the protector and recesses positioned at the lower surface side on left and right sides of the protector, and
   the protector includes clips as the locking portions, the clips protruding from each of the recesses on the left and right sides and from the convex portion and locked in the mounting elongate hole of the first pipe and in the mounting elongate hole of the second pipe.

3. The instrument panel structure according to claim 2, wherein
   the reinforcement includes a taper portion reduced in diameter in a taper shape between the first pipe and the second pipe, and
   the protector includes inclined surfaces between a lower surface of the convex portion and a lower surface of each of the recesses on the left and right sides, the inclined surfaces coming into contact with the taper portion.

* * * * *